United States Patent [19]

Lunde et al.

[11] 4,212,686
[45] Jul. 15, 1980

[54] ZIRCONIUM ALLOYS

[75] Inventors: Liv Lunde, Nittedal, Norway; Raymond C. Asher, Newbury, England; Gerard Slattery, Leatown, Nr. Preston, England; Frank W. Trowse, Preston, England; Christopher Tyzack, Hale Barns, England; Gustar C. Östberg, Stockholm, Sweden; Erich Tolksdorf, Nieder-Roden-Rollwald, Fed. Rep. of Germany

[73] Assignees: AB Atomenerg, Nykoping, Sweden; Atomenergikommissionen, Copenhagen, Denmark; Institutt for Atomenergi, Kjeller, Norway; United Kingdom Atomic Energy Authority, London, England; Valtion Teknillinen Tutkimuskeskus, Helsinki, Finland

[21] Appl. No.: 883,175

[22] Filed: Mar. 3, 1978

Related U.S. Application Data

[63] Continuation of Ser. No. 692,902, Jun. 4, 1976, abandoned, which is a continuation of Ser. No. 489,046, Jul. 16, 1974, abandoned.

[51] Int. Cl.$^2$ .......................... C21D 1/26; C22C 16/00
[52] U.S. Cl. .................. 148/11.5 F; 75/177; 148/32; 148/133
[58] Field of Search ................. 75/177; 148/133, 32, 148/11.5 F

[56] References Cited

U.S. PATENT DOCUMENTS

| | | | |
|---|---|---|---|
| 3,121,034 | 2/1964 | Anderko et al. | 75/177 |
| 3,150,972 | 9/1964 | Rosler | 75/177 |
| 3,205,070 | 9/1965 | Bertea et al. | 75/177 |
| 3,575,806 | 4/1971 | Boulton | 75/177 |
| 3,664,825 | 5/1972 | Bergquist | 75/177 |

FOREIGN PATENT DOCUMENTS 1359217 7/1974 United Kingdom .................... 75/175.5

OTHER PUBLICATIONS

BMI-1168, "The Mechanical Properties of Zirconium and Zircaloy 2", Shaber, et al. Feb. 18, 1957, p. 3.

Primary Examiner—L. Dewayne Rutledge
Assistant Examiner—Michael L. Lewis
Attorney, Agent, or Firm—Watson, Cole, Grindle & Watson

[57] ABSTRACT

The present invention concerns improved corrosion resistant zirconium alloys consisting of 0.25 to 1.50% by weight of niobium, 0.025 to 0.20% by weight of tin, 0.02 to 1.00% by weight of combined chromium and molybdenum, and the remainder zirconium except for unavoidable impurities.

Corrosion tests show that the above alloys have a corrosion rate comparable to Zircaloy 2 at low temperatures and a much better performance at high temperatures. Further the hydrogen uptake of the present alloys are considerably lower than for Zircaloy 2 over the whole temperature range 290°–500° C., and reactor tests have revealed that the good corrosion behavior is maintained under neutron irradiation. The new alloys exhibit smaller grain growth than Zircaloy 2 at annealing temperatures.

6 Claims, No Drawings

ZIRCONIUM ALLOYS

This is a continuation application of our copending application Ser. No. 692,902 of June 4, 1976, now abandoned, which was a continuation application of application Ser. No. 489,046 of July 16, 1974, now abandoned.

This invention relates to corrosion resistant zirconium alloys.

Zirconium alloys have been widely used for fuel cladding, pressure tubes and core internals due to their low neutron cross section, satisfactory corrosion, and mechanical properties.

For commercial water cooled reactors the zirconium-tin alloys Zircaloy 2 (1.50% Sn, 0.15% Fe, 0.10% Cr and 0.05% Ni, balance Zr) and Zircaloy 4 (1.50% Sn, 0.22% Fe, 0.10% Cr and at most 0.007% Ni, balance Zr) have been extensively used (All percentages given in this document are by weight). Below 300° C., and in absence of irradiation, these alloys have the lowest corrosion rate reported for any zirconium alloys, but their corrosion rate increases rapidly with temperature. Under combined action of oxygen and irradiation the corrosion rate might be increased considerably.

A series of alloys with much better corrosion resistance at high temperature than Zircaloy 2 and 4 are already known. These alloys, consisting mainly of Zr, Cr and Fe, all have the disadvantage of a much higher corrosion rate than Zircaloy 2 and 4 at low temperature. The high temperature corrosion resistance is for most of such alloys dependent upon a complicated heat treatment, increasing their price as finished products to amounts too high for large-scale commerical utilisation.

Zirconium alloyed with 1.0% Nb has been widely used for fuel cladding tubes in the USSR, and zirconium alloyed with 2.5% Nb is used for reactor pressure tubes in many countries. These alloys have a corrosion rate higher than the Zircaloys out-of-pile, especially in oxygen-containing environments. The main difficulty with these alloys is that the corrosion behaviour is very dependent upon a correct thermal treatment. This problem is especially pronounced for the corrosion behaviour of welds.

Zirconium-niobium-tin alloys are also known. Among these alloys most experience is available about Ozhenite 0.5 and zirconium alloyed with 3% Nb and 1% Sn. Ozhenite 0.5 is composed of 0.2% Sn, 0.1% Fe, 0.1% Ni, 0.1% Nb, balance Zr. The combination of Nb and Sn needs to give alloys with a good corrosion resistance over a wide temperature range as Sn ensures the low temperature resistance by counteracting the harmful effect of nitrogen. The alloy with 3% Nb has the same disadvantages as the Nb containing alloys mentioned above, while Ozhenite 0.5 has the disadvantage of lower strength.

The main object of the present invention is to provide improved zirconium alloys which concurrently overcome most of or all the disadvantages indicated above.

Zirconium alloys according to the present invention are characterized in that they consist of 0.25 to 1.50% by weight of niobium, 0.025 to 0.20% by weight of tin, 0.10 to 1.00% by weight of combined chromium and molybdenum, and the remainder being zirconium except for unavoidable impurities.

By adding small amounts of chromium and molybdenum to alloys of Zr-Nb-Sn, improved corrosion resistance and lower sensitivity to heat treatment are achieved. The unique features of the new alloys are:

- corrosion resistance comparable with Zircaloy 2 and 4 at low temperature, and comparable with best high temperature resistant zirconium alloys at high temperature.
- a corrosion rate not accelerated by joint action of oxygen and irradiation.
- good corrosion resistance and mechanical properties not being dependent upon complicated and expensive thermal treatments.

The use of Sn ensures the low temperature resistance and the other alloying additions the high temperature resistance. Our experiments have shown that good corrosion resistance is dependent upon a fine and evenly distributed phase of precipitate. The invented alloys obtain such a second phase morphology in normal fabrication routes, without any quenching and aging steps apart from at the billet stage.

Another advantage is that the precipitate prevents grain growth at prolonged heating above the recrystallisation temperature. This effect originates from pinning of the grain boundaries due to the precipitate.

Chromium and molybdenum can replace each other over a wide range of compositions. Iron is almost always present as an unavoidable impurity in alloys like these. Preferably the alloys should contain at least 0.02% of Fe.

Five alloys which constitute preferred embodiments of the invention, are scanuk 2, 3, 4, 5 and 6 as listed below.

| Alloy | Nb | Sn | Cr | Mo | Fe |
|---|---|---|---|---|---|
| 2 | 0.92–0.94 | 0.06–0.09 | 100 ppm | 45 ppm | 0.04 |
| 3 | 1.10–1.13 | 0.05–0.06 | 0.41–0.54 | 40 ppm | 0.04–0.05 |
| 4 | 0.49–0.54 | 0.05–0.07 | 0.45–0.50 | 40 ppm | 0.03–0.04 |
| 5 | 0.47–0.51 | 0.04–0.05 | 100 ppm | 0.27–0.28 | 0.03–0.04 |
| 6 | 0.56–0.61 | 0.05–0.06 | 0.32 | 0.22 | 0.04 |

Corrosion test results for these alloys and some previously known alloys are shown in tables 1–6.

From the corrosion tests it appears that preferred alloys should have between 0.45 and 1.2% by weight of niobium, 0.04 to 0.1% by weight of tin, 0.25 to 0.60% by weight of combined chromium and molybdenum and 0.02 to 0.05% by weight of iron, the percentage by weight of combined niobium, chromium and molybdenum being between 0.7 and 1.8% in order to yield optimum results.

The corrosion tests are performed in autoclaves and loops under conditions specified in the tables. The alloys have been tested as sheet and tube material. It is seen that the new alloys have the great benefit of having a corrosion rate comparable to Zircaloy 2 at low temperature, and a much better performance at high temperature.

It appears from table 6 that the hydrogen uptake of the alloys is considerably lower than for Zircaloy 2 over the whole temperature range 290°–500° C. The alloys have been tested at 240° C. in the Halden Reactor, and as it appears from table 5, the good corrosion behaviour at low temperatures is maintained under irradiation. Other improved, known alloys such as Zr-Cr-Fe and Ozhenite 0.5 have a much higher corrosion rate in this case.

Table 7 shows a comparison of the grain size of the alloys at different temperatures together with Zircaloy 2. The results clearly demonstrate the better resistance of the present alloys compared with Zircaloy 2 at the same temperature.

For fabrication all the alloys were cast in 15 cm diameter ingot and soaked for 1 hour at 1000°–1050° C. The ingot was upset to 20 cm diameter at a temperature of 950° C., followed by soaking at 1000°–1050° C. for 1 hour. The billet was then forged to 14 cm diameter at a temperature of 950° C. and soaked again at 1000°–1050° C. for 2 hours before a subsequent water quench. Samples for chemical analyses, metallographic examination of grain size end intermetallic distribution were taken from the end and centre of the billet. The billet was then machined in order to remove scale. The further treatment was different dependent on whether the material was to be shaped to bar stock, sheet or tube material.

(1) For bar stock the material was soaked at 750° C. and hot rolled to size with intermediate heating to 750° C. The bar was then subjected to centreless grinding, pickled and annealed for 1 hour at 675° C.

(2) For sheet the material was soaked at 750° C. and forged to reduce the thickness with intermediate heating to 750° C. The final thickness was obtained by cold rolling with intermediate annealing at 675° C. The final rolling gave 60% reduction with no subsequent annealing.

(3) For tube the billet was machined, clad with copper, soaked at 750° C. and extruded. The copper was removed by acid pickling and the tube hollows were annealed at 675° C. The rolling was done by tube-reduction to the desired size with intermediate annealing at 675° C. The final tube reduction gave 70% reduction of area, and the tubes were given a final heat treatment at 600° C. for 4 hours. The tubes were finished outside and aquablast in the bore.

Table 1

Weight gain for various alloys tested in degassed water at 290° C., 74 kg/cm$^2$

| Alloy | Weight gain - mg/dm$^2$ | | | | | |
|---|---|---|---|---|---|---|
| | 168 hours | 504 hours | 1176 hours | 1848 hours | 2856 hours | 3452 hours |
| Scanuk | | | | | | |
| 2 | 8.2 | 10.5 | 13.7 | 16.4 | 18.9 | 20.5 |
| 3 | 8.4 | 11.4 | 14.8 | 17.6 | 20.4 | 22.3 |
| 4 | 8.2 | 9.9 | 12.2 | 14.0 | 15.7 | 16.9 |
| 5 | 8.8 | 11.6 | 13.9 | 16.1 | 18.3 | 19.4 |
| 6 | 9.2 | 13.7 | 16.1 | 18.0 | 19.7 | 20.7 |
| Zr-2 sheet | 9.9 | 12.2 | 14.9 | 15.5 | 16.7 | 17.3 |
| Zr-2½% Nb sheet | 10.1 | 13.2 | 16.3 | 19.6 | 22.4 | 24.3 |
| Zr-2½% Nb pressure tube | 9.5 | 13.2 | 16.0 | 19.2 | 21.5 | 22.9 |

Table 2

Weight gain for various alloys tested in degassed water with 7 ppm oxygen at 290° C., 91 kg/cm$^2$

| Alloy | Weight gain-mg/dm$^2$ | | |
|---|---|---|---|
| | 168 hours | 528 hours | 1200 hours |
| Scanuk | | | |
| 2 | 13.2 | 21.3 | 29.0 |
| 3 | 11.6 | 23.2 | 30.8 |
| 4 | 8.6 | 15.4 | 16.4 |
| 5 | 10.1 | 13.0 | 16.4 |
| 6 | 12.1 | 19.4 | 21.0 |
| Zr-2 sheet | 11.9 | 14.3 | 16.4 |
| Zr-2½% Nb sheet | 16.0 | 38.4 | 56.6 |
| Zr-2½% Nb pressure tube | 15.7 | 24.3 | 33.1 |

Table 3

Weight gain for various alloys tested in steam at 400° C., 70 kg/cm$^2$

| Alloy | Weight gain-mg/dm$^2$ | | | | | |
|---|---|---|---|---|---|---|
| | 72 hours | 336 hours | 624 hours | 1248 hours | 1752 hours | 2424 hours |
| Scanuk | | | | | | |
| 2 | 24.0 | 44.7 | 57.1 | 66.8 | 84.4 | 101.0 |
| 3 | 23.0 | 46.0 | 62.9 | 80.7 | 112.8 | 151.2 |
| 4 | 22.2 | 34.0 | 45.1 | 52.6 | 68.5 | 93.2 |
| 5 | 28.4 | 40.6 | 51.9 | 61.0 | 77.9 | 103.4 |
| 6 | 27.5 | 50.4 | 60.5 | 69.0 | 89.2 | 113.6 |
| Zr-2 sheet | 25.4 | 38.1 | 53.8 | 61.5 | 78.6 | 93.9 |
| Zr-2½% Nb sheet | 38.5 | 75.0 | 99.3 | 132.0 | 192.2 | 260.8 |
| Zr-2½% Nb pressure tube | 29.6 | 48.9 | 62.3 | 70.5 | 90.4 | 120.5 |

Table 4

Weight gain for various alloys tested in steam at 500° C., 70 kg/cm$^2$

| Alloy | Weight gain - mg/dm$^2$ | | | | |
|---|---|---|---|---|---|
| | 72 hours | 168 hours | 336 hours | 672 hours | 1008 hours |
| Scanuk | | | | | |
| 2 | 80.6 | 135 | 229 | 447 | 644.7 |
| 3 | 92.3 | 149 | 294 | 539 | 751.7 |
| 4 | 64.8 | 109 | 233 | 420 | 597.9 |
| 5 | 76.5 | 133 | 234 | 416 | 569.4 |
| 6 | 90.1 | 153 | 293 | 518 | 734.3 |
| Zr-2 sheet | 5797 | disintegrated | | | |
| Zr-2½% Nb sheet | 111 | 207 | 457 | 776 | 1050.6 |
| Zr-2½% Nb pressure tube | 84.4 | 132 | 334 | 556 | 742.7 |

Table 5

Weight gain for alloys tested for 331 days under a neutron irradiation flux of $10^{12}$ neutrons/cm$^2$ . sec. in water at 240° C.

| Alloy | Average weight gain mg/dm$^2$ | Range of measured weight gain mg/dm$^2$ | Number of samples | Appearance |
|---|---|---|---|---|
| Scanuk | | | | |
| 2 | 62.1 | 58.0–64.2 | 4 | Black, brilliant |
| 3 | 53.4 | 51.9–54.3 | 4 | Black, brilliant |
| 4 | 55.9 | 51.0–58.0 | 4 | Black, somewhat dull |
| 5 | 76.5 | 72.8–79.0 | 3 | Black, somewhat dull |
| 6 | 69.8 | 63.0–79.0 | 4 | Black, somewhat dull |
| Zr-2.5% Nb | (66.6) 58.1 | (63.0–69.1) 51.9–63.0 | (3) 3 | Grey, dull |
| Ozhenite 0.5 | 143.4 | 135.8–150.6 | 3 | Black, brilliant |
| Zr—Cr—Fe | 130.9 | 128.4–133.3 | 3 | Black |
| Zr-2 | 54.3 | 53.1–55.6 | 3 | Black, brilliant |

Table 6

Hydrogen uptake under various test condition

| Test condition | Degassed water 290° C., 74 kg/cm$^2$ 2856 hours | | Steam 400° C. 70 kg/cm$^2$ 2682 hours | | Steam 500° C. 70 kg/cm$^2$ 1008 hours | |
|---|---|---|---|---|---|---|
| Alloy | mgH$_2$/dm$^2$ | % H$_2$ | mgH$_2$/dm$^2$ | % H$_2$ | mgH$_2$/dm$^2$ | % H$_2$ |
| Scanuk | | | | | | |
| 2 | 0.23 | 9.7 | 3.02 | 21.3 | 28.81 | 36.8 |
| 3 | 0.23 | 9.7 | 4.74 | 21.7 | 52.11 | 57.4 |
| 4 | 0.20 | 10.7 | 3.98 | 31.6 | 32.19 | 43.4 |
| 5 | 0.28 | 11.7 | 4.39 | 28.7 | 37.57 | 55.6 |
| 6 | 0.29 | 11.8 | 6.29 | 38.9 | 53.02 | 56.9 |
| Zr-2 sheet | 0.88 | 11.9 | 5.37 | 40.7 | disintegrated | |

Table 6-continued

| | Hydrogen uptake under various test condition | | | | | |
|---|---|---|---|---|---|---|
| Test condition | Degassed water 290° C., 74 kg/cm$^2$ 2856 hours | | Steam 400° C. 70 kg/cm$^2$ 2682 hours | | Steam 500° C. 70 kg/cm$^2$ 1008 hours | |
| Alloy | mgH$_2$/dm$^2$ | % H$_2$ | mgH$_2$/dm$^2$ | % H$_2$ | mgH$_2$/dm$^2$ | % H$_2$ |
| Zr-2.5% Nb Sheet | 0.38 | 4.0 | 7.75 | 20.7 | 46.36 | 37.3 |
| Zr-2.5% Nb Pressure tube | 0.30 | 11.0 | 3.43 | 20.1 | 34.20 | 38.1 |

Table 7

| | | Grain size in dependence of annealing temperature. | | | | | |
|---|---|---|---|---|---|---|---|
| | Tem- | Alloy | | | | | |
| Time (hours) | per- ature (°C.) | Scanuk 2 | Scanuk 3 | Scanuk 4 | Scanuk 5 | Scanuk 6 | Zr-2 |
| | | Average grain size in microns | | | | | |
| 24 | 550 | 4.1 | 3.8 | 3.6 | 3.7 | 3.9 | 4.9 |
| | 600 | 4.7 | 4.2 | 3.9 | 4.1 | 4.4 | 5.8 |
| | 650 | 5.3 | 4.4 | 4.3 | 4.5 | 5.1 | 7.3 |
| | 700 | 7.4 | 5.1 | 5.0 | 5.8 | 5.9 | 9.2 |
| | 760 | 9.0 | 6.3 | 6.5 | 6.7 | 6.6 | 11.9 |

What we claim is:

1. Zirconium alloys which are characterized by their corrosion resistance and machanical properties, the alloys consisting essentially of 0.25 to 1.50% by weight of niobium, 0.025 to 0.20% by weight of tin, 0.02 to 1.00% by weight of total chromium and molybdenum, each of said chromium and molybdenum being present in respective amounts of at least 100 p.p.m. for chromium and 45 p.p.m. for molybdenum, and the remainder of zirconium.

2. Zirconium alloys which are characterized by their corrosion resistance and mechanical properties, the alloys consisting of 0.45 to 1.20% by weight of niobium, 0.04 to 0.1% by weight of tin, 0.25 to 0.60% by weight of total chromium and molybdenum, each of said chromium and molybdenum being present in respective amounts of at least 100 p.p.m. for chromium and 40 p.p.m. for molybdenum, and 0.02 to 0.05% by weight of iron, the percentage by weight of niobium, chromium and molybdenum being between 0.7 to 1.8%, and the remainder of zirconium.

3. Corrosion resistant nuclear reactor components manufactured from zirconium-base alloys containing minor amounts of niobium, tin, chromium and molybdenum, said minor amounts being within the range of 0.025 to 1.50% by weight of niobium, 0.025 to 0.020% by weight of tin, and 0.02 to 1.00% by weight of total chromium and molybdenum, each of said chromium and molybdenum being present in respective amounts of 100 p.p.m. for chromium and 40 p.p.m. for molybdenum; said reactor components being formed by cold shaping said alloys and then annealing for less than four hours at temperatures less than 700° C. without subsequent quenching or forced cooling, essentially without loss of corrosion resistance and mechanical properties of said alloys.

4. Corrosion resistant nuclear reactor components manufactured from zirconium-base alloys containing minor amounts of niobium, tin, iron, chromium and molybdenum, each of said chromium and molybdenum being present in respective amounts of at least 100 p.p.m. for chromium and 40 p.p.m. for molybdenum, said minor amounts being within the ranges 0.45 to 1.20% by weight of niobium, 0.04 to 0.1% by weight of tin, 0.25 to 0.60% by weight of iron, the combined percentage by weight of niobium, chromium and molybdenum being between 0.7 to 1.8; said reactor components being formed by cold shaping said alloys and then annealing for less than four hours at temperatures less than 700° C. without subsequent quenching or forced cooling, essentially without loss of corrosion resistance and mechanical properties of said alloys.

5. A method for simplified manufacture of corrosion resistant nuclear reactor components of zirconium-base alloys containing minor amounts of niobium, tin and at least one element of the group of elements consisting of chromium and molybdenum, said method including the following steps:

(a) selecting said minor amounts within the ranges of 0.25 to 1.50% by weight of niobium, 0.025 to 0.20% by weight of tin and 0.02 to 1.00% by weight of chromium and molybdenum, said chromium being present in an amount of at least 100 p.p.m and said molybdenum being present in an amount of at least 40 p.p.m, (b) cold shaping said alloys, and (c) thermally treating said alloys, said thermal treatment consisting of annealing for less than four hours at temperatures less than 700° C. without subsequent quenching or forced cooling, essentially without loss of corrosion resistance and mechanical properties of said alloys.

6. A method for simplified manufacture of corrosion resistant nuclear reactor components of zirconium-base alloys containing minor amounts of niobium, tin, iron and at least one element of the group of elements consisting of chromium and molybdenum, said method comprising the following steps:

(a) selecting said minor amounts within the ranges of 0.45 to 1.20% by weight of niobium, 0.04 to 0.1% by weight of tin, 0.25 to 0.60% by weight of iron, the combined percentage by weight of niobium, said chromium being present in an amount of at least 100 p.p.m and said molybdenum being present in an amount of at least 40 p.p.m, chromium and molybdenum being between 0.7 and 1.8, (b) cold shaping said alloys, and (c) thermally treating said alloys, said thermal treatment consisting of annealing for less than four hours at temperatures less than 700° C. without subsequent quenching or forced cooling, essentially without loss of corrosion resistance and mechanical properties of said alloys.

* * * * *